United States Patent
Itzhaki et al.

(10) Patent No.: US 11,509,647 B2
(45) Date of Patent: Nov. 22, 2022

(54) DETERMINATION OF WEAK HASHED CREDENTIALS

(71) Applicant: Microsoft Technology Licensing, LLC, Redmond, WA (US)

(72) Inventors: Shira Itzhaki, Tel Aviv (IL); Moshe Israel, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 16/259,520

(22) Filed: Jan. 28, 2019

(65) Prior Publication Data
US 2020/0244640 A1 Jul. 30, 2020

(51) Int. Cl.
*H04L 9/40* (2022.01)
*H04L 9/06* (2006.01)

(52) U.S. Cl.
CPC .......... *H04L 63/083* (2013.01); *H04L 9/0643* (2013.01)

(58) Field of Classification Search
CPC ..... H04L 63/083; H04L 9/0643; G06F 21/46; G06F 21/31; H04W 12/0608
See application file for complete search history.

(56) References Cited

U.S. PATENT DOCUMENTS

| | | | |
|---|---|---|---|
| 7,509,495 B2* | 3/2009 | Roig | H04L 63/083 713/168 |
| 7,581,245 B2* | 8/2009 | Rojewski | G06F 21/46 726/18 |
| 8,640,212 B2* | 1/2014 | Todorov | H04L 63/083 705/40 |
| 9,087,187 B1* | 7/2015 | Doane | H04L 9/321 |
| 9,300,643 B1* | 3/2016 | Doane | H04L 63/08 |
| 9,565,020 B1* | 2/2017 | Camenisch | H04L 9/0863 |
| 9,967,236 B1* | 5/2018 | Ashley | H04L 63/083 |
| 10,051,001 B1* | 8/2018 | Ashley | H04L 63/14 |
| 2005/0022020 A1* | 1/2005 | Fremberg | H04L 63/083 726/4 |
| 2005/0108551 A1* | 5/2005 | Toomey | G06F 21/33 713/185 |

(Continued)

OTHER PUBLICATIONS

"International Search Report and Written Opinion Issued in PCT Application No. PCT/US2019/067649", dated Mar. 31, 2020, 12 Pages.

(Continued)

*Primary Examiner* — Saleh Najjar
*Assistant Examiner* — Nhan Huu Nguyen
(74) *Attorney, Agent, or Firm* — Mannava & Kang, P.C.

(57) ABSTRACT

According to examples, an apparatus may include a processor and a non-transitory computer readable medium on which is stored machine readable instructions that may cause the processor to access a hashed credential associated with a user or a device, access hashed versions of a plurality of commonly used credentials, determine whether the hashed credential matches a hashed version of a commonly used credential of the plurality of commonly used credentials, and based on a determination that the hashed credential matches a hashed version of a commonly used credential, perform at least one of a reporting or a blocking operation.

16 Claims, 5 Drawing Sheets

(56) References Cited

U.S. PATENT DOCUMENTS

| | | | | |
|---|---|---|---|---|
| 2005/0198537 | A1* | 9/2005 | Rojewski | H04L 9/3226 726/19 |
| 2006/0036871 | A1* | 2/2006 | Champine | H04L 9/3236 713/183 |
| 2007/0006305 | A1* | 1/2007 | Florencio | H04L 63/1483 726/22 |
| 2008/0181403 | A1* | 7/2008 | Sakamoto | H04L 9/3236 708/250 |
| 2011/0087888 | A1* | 4/2011 | Rennie | H04L 63/08 713/182 |
| 2011/0252229 | A1* | 10/2011 | Belenkiy | H04L 63/0853 713/155 |
| 2011/0296509 | A1* | 12/2011 | Todorov | H04L 9/3271 726/7 |
| 2011/0314548 | A1* | 12/2011 | Yoo | G06F 21/56 726/24 |
| 2012/0324557 | A1* | 12/2012 | Rubin | G06F 21/50 726/7 |
| 2013/0212385 | A1* | 8/2013 | Schechter | H04L 9/0877 713/168 |
| 2013/0219184 | A1* | 8/2013 | Amaya Calvo | H04L 9/3236 713/176 |
| 2014/0165169 | A1* | 6/2014 | Buck | G06F 21/46 726/7 |
| 2014/0317705 | A1* | 10/2014 | Eluard | G06F 21/31 726/6 |
| 2014/0325622 | A1* | 10/2014 | Luk | H04L 9/0891 726/6 |
| 2015/0026784 | A1* | 1/2015 | Kurkure | H04L 63/083 726/7 |
| 2015/0304315 | A1* | 10/2015 | Estehghari | H04L 9/0825 713/156 |
| 2016/0044034 | A1* | 2/2016 | Spilman | G06F 21/6209 713/181 |
| 2016/0269393 | A1* | 9/2016 | Corella | G06F 21/33 |
| 2016/0301694 | A1* | 10/2016 | Luk | H04L 9/3236 |
| 2017/0104745 | A1* | 4/2017 | Camenisch | H04L 9/085 |
| 2017/0195346 | A1* | 7/2017 | Be'Ery | H04L 63/083 |
| 2017/0208075 | A1* | 7/2017 | Kerametlian | G06F 21/31 |
| 2018/0007087 | A1* | 1/2018 | Grady | H04L 63/101 |
| 2018/0302406 | A1* | 10/2018 | Burckhardt | H04L 63/1441 |
| 2018/0309721 | A1 | 10/2018 | Ashley et al. | |
| 2018/0367309 | A1* | 12/2018 | Reinhold | H04L 9/0662 |
| 2019/0007387 | A1* | 1/2019 | Jin | H04L 9/3226 |
| 2020/0036529 | A1* | 1/2020 | Dequen | H04L 9/0863 |
| 2020/0082124 | A1* | 3/2020 | Pedersen | G06F 21/45 |

OTHER PUBLICATIONS

Rowan, Tom, "Password protection: the next generation", In Journal of Network security, vol. 2009, Issue 2, Feb. 1, 2009, pp. 4-7.

* cited by examiner

COMPUTER READABLE MEDIUM
500

DETERMINE WHETHER A STRENGTH OF A HASHED CREDENTIAL IS TO BE ANALYZED LOCALLY OR AT A REMOTE COMPUTING DEVICE
502

BASED ON A DETERMINATION THAT THE HASHED CREDENTIAL IS TO BE ANALYZED LOCALLY, ACCESS HASHED VERSIONS OF COMMONLY USED CREDENTIALS, DETERMINE WHETHER THE HASHED CREDENTIAL MATCHES A HASHED VERSION, AND BASED ON A DETERMINATION THAT THE HASHED CREDENTIAL MATCHES A HASHED VERSION OF A COMMONLY USED CREDENTIAL, PERFORM AT LEAST OF A REPORTING OR A BLOCKING OPERATION
504

BASED ON A DETERMINATION THAT THE HASHED CREDENTIAL IS TO BE ANALYZED AT A REMOTE COMPUTING DEVICE, SEND A HASH FUNCTION USED TO GENERATE THE HASHED CREDENTIAL TO THE REMOTE COMPUTING DEVICE
506

*FIG. 5*

DETERMINATION OF WEAK HASHED CREDENTIALS

BACKGROUND

Credentials, such as user names and passwords, are commonly used to restrict access to services and/or devices from unwanted access. Users are often able to create their own credentials and in some instances, users create credentials that may be insecure. For instance, users may create credentials that are easy for the users to remember, which may be names or phrases that others may relatively easily guess. To increase security of the credentials, guidelines are often enforced to aid users in creating secure credentials. For example, the guidelines may indicate that a password must have a minimum length and must use certain characters. However, even when a user complies with the guidelines, the user may often create credentials that may be identified through a brute force attack using commonly used credentials.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Credentials, such as passwords, identifiers, names, etc., associated with users and devices may be used to restrict access to services and/or devices to those users and device that input the correct credentials. The use of weak credentials, e.g., credentials that may be known as having been or being used commonly, may result in the credentials being identified through brute-force attempts using the commonly used credentials. As such, the use of weak credentials may enable malevolent actors to gain unintended access to the services and/or devices by identifying the credentials.

Disclosed herein are apparatuses and methods for determining whether a credential, e.g., a hashed credential, is weak based on a determination as to whether the credential matches a commonly used credential. According to examples, a hash function may be applied to the credential to create a hashed credential such that the credential may remain secret while the credential is communicated to an apparatus from a device and/or to a remote server.

A processor may access the hashed credential, which may be associated with a user or a device. The credential may be a password, a user name, an identifier, or the like. The processor may also access hashed versions of a plurality of commonly used credentials, which may include credentials included in a dictionary of commonly used credentials. That is, for instance, the processor may access the commonly used credentials and may create hashed versions of the commonly used credentials using the same hash function used to create the hashed credential. The processor may also compare the hashed credential with the hashed versions of the commonly used credentials to determine whether there are any matches. Based on a determination that the hashed credential matches a hashed version of a commonly used credential, the processor may perform at least one of a reporting or a blocking operation.

In some examples, the hashed credential may be stored in the same apparatus as the processor. In these examples, the hashed credential may not be communicated out of the apparatus for the comparison with the hashed versions to be made. In other examples, the hashed credential may be stored in a device that is separate from the apparatus. In these examples, the processor may obtain the hashed credential from the device. In still other examples, the processor may send the hash function used to create the hashed credential to an external server, in which the external server may create the hashed versions of the commonly used credentials. The external server may also determine whether the hashed credential matches any of the hashed versions of the commonly used credentials and may inform the processor of whether the hashed credential matches any of the hashed versions of the commonly used credentials.

In some examples, the external server may create the hashed versions of the commonly used credentials and may send the hashed versions of the commonly used credentials to the processor. In these examples, the processor may determine whether the hashed credential matches any of the hashed versions of the commonly used credentials.

A technical problem associated with the credentials used by many users may be that the credentials may be relatively easily identified through brute-force attempts using known credentials and the credentials may be used to bypass security measures on devices. This may occur even when the credentials comply with guidelines designed to ensure that the credentials are strong. Through implementation of the apparatuses and methods disclosed herein, a determination as to whether the hashed credential matches a hashed version of a commonly used credential may be made. In addition, at least one of a reporting or a blocking operation may be performed based on a determination that the hashed credential matches a hashed version of a commonly used credential. As such, for instance, the weak credential may be identified and access to a service, application, device, network, or the like may be prevented or blocked. A technical solution to the technical problem discussed above may thus be that features of the present disclosure may enhance security of devices and networks.

Figure 1:
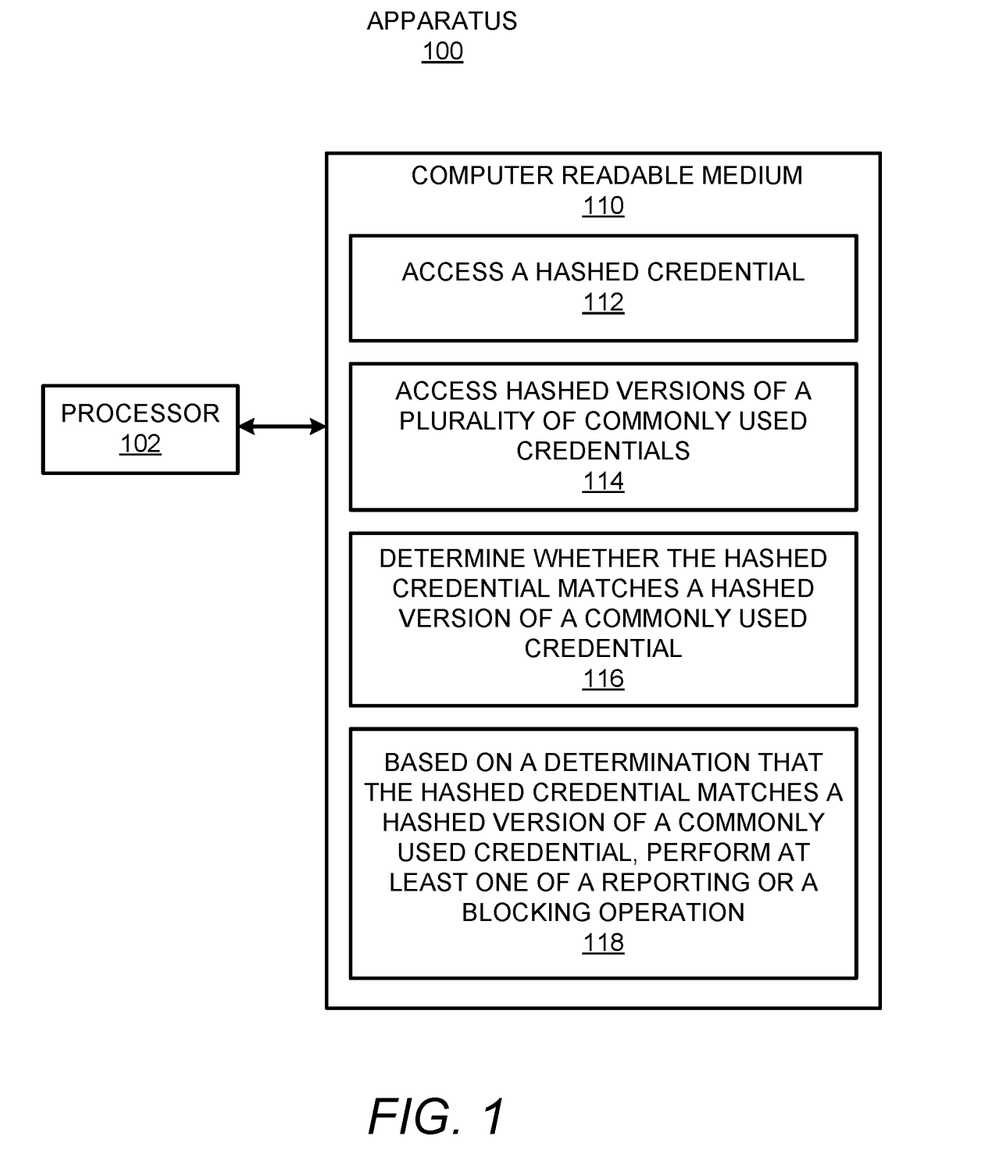
FIG. 1 depicts a block diagram of an apparatus that may determine whether a credential associated with a user or a device is weak in accordance with an embodiment of the present disclosure.
Figure 2:
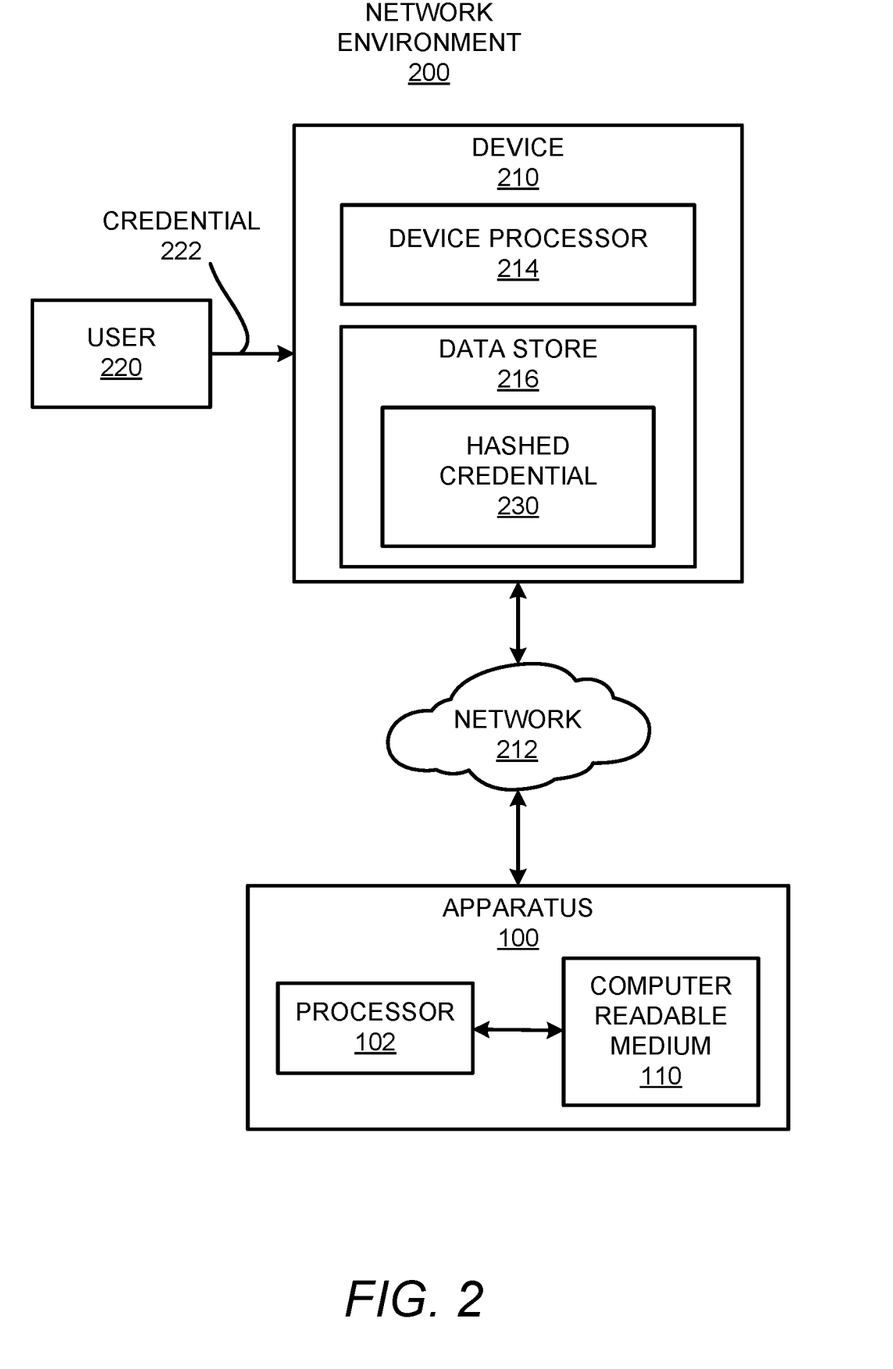
FIG. 2 depicts a block diagram of a network environment in which the apparatus depicted in FIG. 1 may be implemented to determine whether a credential associated with a user or a device is weak in accordance with an embodiment of the present disclosure.

Reference is first made to FIG. 1 and FIG. 2. FIG. 1 shows a block diagram of an apparatus 100 that may determine whether a credential associated with a user or a device is weak in accordance with an embodiment of the present disclosure. FIG. 2 shows a block diagram of a network environment 200 in which the apparatus 100 depicted in FIG. 1 may be implemented to determine whether a credential associated with a user or a device is weak in accordance with an embodiment of the present disclosure. It should be understood that the apparatus 100 depicted in FIG. 1 and/or the network environment 200 depicted in FIG. 2 may include additional features and that some of the features described herein may be removed and/or modified without departing from the scope of the apparatus 100 and/or the network environment 200.

The apparatus 100 may be a server, a node in a network (such as a data center), a personal computer, a laptop computer, a tablet computer, a smartphone, a network gateway, a network router, an Internet of Things (IoT) device, and/or the like. As shown in FIG. 2, the apparatus 100 may be part of a network environment 200 in which the apparatus 100 may communicate with a device 210 via a network 212. The device 210 may be a personal computer, a laptop computer, a tablet computer, a smartphone, a network gateway, a network router, or a server. The network 212 may be a local area network, a direct connection, a wide area network, the Internet, or the like. In instances in which the network 212 is a local area network, the network 212 may be a wireless fidelity network, a Bluetooth™ connection, or the like.

A user 220 may interact with the device 210. For instance, the user 220 may input a credential 222, which may be a user name, a user password, a device name, a device password, an application password, etc., into the device 210. The user 220 may input the credential 222 into the device 210 for various purposes, such as to access operations of the device 210, to access an application running on the device 210, to connect the device 210 to a network 212, or the like. The credential 222 may thus be associated with the user 220, e.g., when the credential 222 is a user name (identifier) or a user password. The user 220 may input the user credentials 222 to access the device 210, to access an application, to access a website, and/or the like. The credential 222 may also or alternatively be associated with the device 210, e.g., when the credential 222 is a device name (identifier) or a device password, which may be stored in the device 210. In this case, the user 220 may not input the credential 222 into the device 210. The device 210 credential may, for instance, be used to authenticate the device 210 prior to the device 210 being allowed to connect to the network 212.

As also shown in FIG. 2, the device 210 may include a device processor 214 that may apply a hash (or equivalently, a hash or hashing function), e.g., a cryptographic hash, to the credential 222 and that may store the hashed credential 230 in a data store 216 of the device 210. For instance, the device processor 214 may apply a cryptographic hash function to the credential 222 to make it difficult or impossible to identify the credential 222 from the hashed credential 230 without knowledge of the credential 222. In some examples, a salt value, e.g., a value or other data that may be used as an additional input to the credential 222, may be added to the credential 222 prior to the credential 222 being hashed to make identification of the credential 222 from the hashed credential 230 more difficult. The salt value may be a random value or may include multiple random values, for instance.

According to examples, the apparatus 100 may determine whether the credential 222 matches a commonly used credential, e.g., is a weak credential, and may thus be relatively easily identified. A commonly used credential may be defined as a credential that are known to be or to have been used by a number of people and may thus be identified through brute-force attempts at identifying credentials using the commonly used credentials. In some examples, the apparatus 100 may be separate from the device 210 and thus the apparatus 100 may remotely determine whether the credential 222 matches a commonly used credential. In other examples, the user 220 may input the credential 222 into the apparatus 100 and the apparatus 100 may determine whether the credential 222 inputted into the apparatus 100 matches a commonly used credential.

As shown in FIGS. 1 and 2, the apparatus 100 may include a processor 102 and a computer readable medium 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single machine readable medium 110 may be understood to additionally or alternatively pertain to multiple processors 102 and multiple computer readable mediums 110.

The computer readable medium 110 may be, for example, a Random Access memory (RAM), an Electrically Erasable Programmable Read-Only Memory (EEPROM), a storage device, an optical disc, or the like. The computer readable medium 110, which may also be referred to as a machine readable storage medium, may be a non-transitory computer readable storage medium, where the term "non-transitory" does not encompass transitory propagating signals. In any regard, the computer readable medium 110 may have stored thereon machine readable instructions 112-118.

The processor 102 may fetch, decode, and execute the instructions 112 to access a hashed credential 230 associated with a user 220 or a device 210. As discussed herein, the hashed credential 230 may be a hashed version of a user name, user password, a device name, a device password, or the like. In examples in which the hashed credential 230 is stored on the apparatus 100, the processor 102 may access the hashed credential 230 from a local data store (not shown). In these examples, the processor 102 may analyze the hashed credential 230 locally and thus, the hashed credential 230 may be analyzed without having to communicate the hashed credential 230 over the network 212.

In other examples in which the hashed credential 230 is stored in the data store 216 of the device 210, the processor 102 may access the hashed credential 230 from the device 210. For instance, the processor 102 may request the hashed credential 230 from the device 210 and the device 210 may communicate the hashed credential 230 to the apparatus 100 via the network 212. In any regard, the processor 102 may automatically, e.g., without input from a user, operator, administrator, or the like, access the hashed credential 230. In addition, the processor 102 may periodically access the hashed credential 230 from the device, e.g., according to a predefined schedule. The predefined schedule may be user-defined. Moreover, the processor 102 may periodically access hashed credentials 230 from multiple devices.

The processor 102 may fetch, decode, and execute the instructions 114 to access hashed versions of a plurality of commonly used credentials. The plurality of commonly used credentials may be a collection, e.g., a dictionary or other list, of commonly used credentials. The collection of commonly used credentials may include a dictionary of credentials that may have been generated by a number of sources. For instance, the dictionary of credentials may include a publicly or privately available list of credentials that is known to be used most frequently. In a particular example, the dictionary of credentials may be a common dictionary of terms. The processor 102 may access the commonly used credentials from a public source (such as the Internet) or a private source (such as a local data store, a server, or the like).

According to examples, the processor 102 may apply the same hash function used to generate the hashed credential 230 to the plurality of commonly used credentials. That is, for instance, the processor 102 may have access to the hash function used to generate the hashed credential 230 and may apply that hash function to the commonly used credentials to generate the hashed versions of the commonly used credentials. In some examples, the processor 102 may generate hashed versions of each of the accessed commonly used credentials and may compare the hashed credential 230 to each of the generated hashed versions until a determination is made that the hashed credential 230 does not match or matches one of the hashed versions. In other examples, the processor 102 may iteratively generate a hashed version of a commonly used credential and may compare the hashed credential 230 to the generated hashed version until a match is identified or the hashed credential 230 has been compared with all of the hashed versions of the commonly used credentials without a match being identified. That is, a commonly used credential that has been hashed with the same hash function used to generate the hashed credential 230 will be the same as the hashed credential 230.

In examples in which a salt value was added to the credential 222 prior to the hashing function being applied to the credential 222, the processor 102 may add the salt value to the commonly used credential and may apply the hash function to the commonly used credential with the added salt value.

In other examples, the processor 102 may send the hashing function used to hash the credential 222 to an external server (not shown), e.g., a server in the cloud, a remotely located server, or the like. In these examples, the external server may access the plurality of commonly used credentials and may generate the hashed versions of the commonly used credentials using the hashing function. The processor 102 may also send the salt value added to the credential 222 to generate the hashed credential 230 to the external server and the external server may generate the hashed versions of the commonly used credentials with the added salt value. In any regard, the external server may send the hashed versions to the processor 102. As a result, the external server, instead of the processor 102, may generate the hashed versions of the commonly used credentials, which may be computationally intensive.

The processor 102 may fetch, decode, and execute the instructions 116 to determine whether the hashed credential 230 matches a hashed version of a commonly used credential of the plurality of commonly used credentials. The processor 102 may make this determination by comparing the hashed credential 230 with hashed versions of the commonly used credentials. The processor 102 may determine that the hashed credential 230 matches a hashed version of a commonly used credential when a match is made with one of the hashed versions. Alternatively, the processor 102 may determine that the hashed credential 230 does not match a hashed version when no matches are made with any of the hashed versions. According to examples, the processor 102 may perform string comparisons between the hashed credential 230 and the hashed versions of the commonly used credentials. As a result, the processor 102 may not perform brute-force attempts to determine whether the hashed credential 230 matches any of the hashed versions.

The processor 102 may fetch, decode, and execute the instructions 118 to, based on a determination that the hashed credential 230 matches a hashed version of a commonly used credential, perform at least one of a reporting or a blocking operation. For instance, the processor 102 may output an alert, such as an audible and/or visual indication for the user 220 to receive, in which the alert includes an indication that the credential 222 may match a known common credential. As another example, the processor 102 may disable a user 220 access to the device 210, an application, a service, a network through which the device 210 may provide access, or the like. By way of example, the processor 102 may cause the device 210 to block or disable the user access.

As a further example, the processor 102 may cause the device 210 to shut down the device 210. For instance, the processor 102 may have privileges over the device 210 to cause the device 210 to be shutdown. As a yet further example, the processor 102 may quarantine the device 210 from a network such that the user 220 may continue to use the device 210 locally, but the device 210 may not send or receive data via a network.

According to examples, the processor 102 may perform the blocking operation until the processor 102 determines that the credential 222 has been changed to include an arrangement of values and/or symbols that do not match any of the accessed commonly used credentials. In addition, or alternatively, a user, an administrator, or the like, may define the reporting and/or blocking operation performed based on a determination that the hashed credential 230 matches a hashed version of a commonly used credential. The user, administrator, or the like may also define when the plurality of commonly used credentials are updated to, for instance, include newly identified commonly used credentials in the comparison with the hashed credential 230.

Instead of the machine readable instructions 112-118, the apparatus 100 may include hardware logic blocks that may perform functions similar to the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

Figure 3:
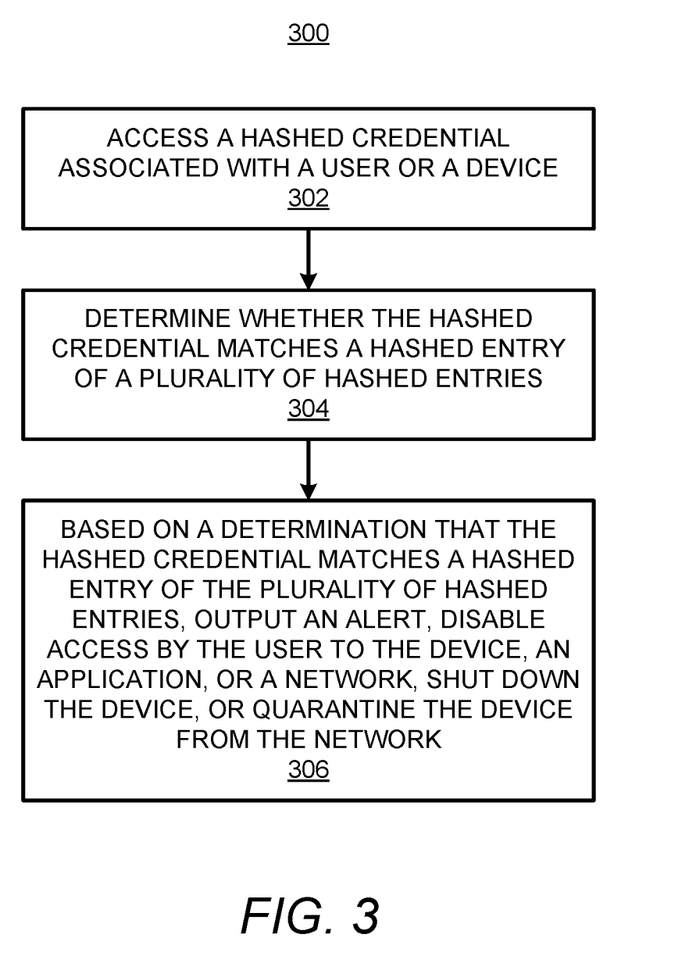
FIG. 3 depicts a flow diagram of a method for determining whether a credential matches an entry in a dictionary of commonly used credentials in accordance with an embodiment of the present disclosure.
Figure 4:
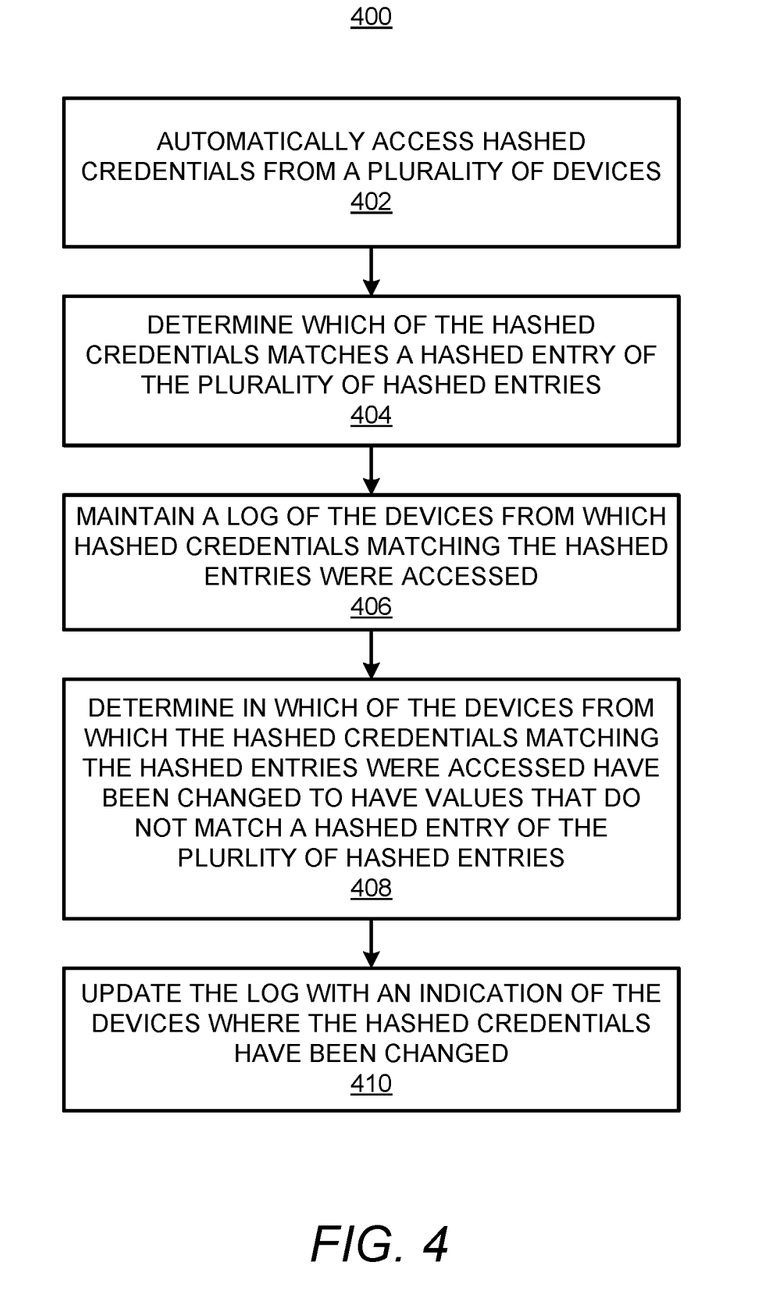
FIG. 4 depicts a flow diagram of a method for maintaining and updating a log of hashed credentials in accordance with an embodiment of the present disclosure.

Various manners in which the processor 102 of the apparatus 100 may operate are discussed in greater detail with respect to the methods 300 and 400 respectively depicted in FIGS. 3 and 4. Particularly, FIG. 3 depicts a flow diagram of a method 300 for determining whether a credential 222 matches an entry in a dictionary of commonly used credentials in accordance with an embodiment of the present disclosure. In addition, FIG. 4 depicts a flow diagram of a method 400 for maintaining and updating a log of hashed credentials in accordance with an embodiment of the present disclosure. It should be understood that the methods 300 and 400 depicted in FIGS. 3 and 4 may include additional operations and that some of the operations described therein may be removed and/or modified without departing from the scopes of the methods 300 and 400. The descriptions of the methods 300 and 400 are made with reference to the features depicted in FIGS. 1-2 for purposes of illustration.

At block 302, the processor 102 may access a hashed credential 230 associated with a user 220 or a device 210. The processor 102 may access the hashed credential 230 in any of the manners discussed above.

At block 304, the processor 102 may determine whether the hashed credential 230 matches a hashed entry of a plurality of hashed entries, in which a plurality of entries corresponding to the plurality of hashed entries are included in a dictionary of commonly used credentials. As discussed herein, the processor 102 may determine or access the hashing function or hashing value (which may also be referenced herein as a hash function or a hash value) used to generate the hashed credential 230. As also disclosed herein, the hashing function or hashing value may be applied to the entries in the dictionary of commonly used credentials to generate hashed entries corresponding to the plurality of entries included in the dictionary of commonly used credentials. The processor 102 may also determine or access a salt value added to the credential 222 prior to the hashing function or hashing value being applied to the credential 222 and the salt value may be added to the entries in the dictionary prior to the hashed entries being generated. As also discussed herein, the processor 102 may generate the hashed entries or may receive the hashed entries from an external server.

In examples in which the processor 102 generates the hashed entries, the processor 102 may apply the hash function to the plurality of entries in the dictionary. In examples in which the external server generates the the hashed credential 230 to the external server (which is also referenced herein as a remote server). The remote server may apply the hash function to a plurality of entries to generate the plurality of hashed entries. In addition, the processor 102 may receive the plurality of hashed entries from the remote server.

In addition, in examples in which a salt value is added to the credential 222 prior to the hash function being applied to the credential 222, the processor 102 or the remote server may also add the salt value to the entries to generate the hashed entries with the salt value.

In any regard, the processor 102 may compare the hashed credential 230 to the hashed entries to determine whether the hashed credential 230 matches any of the hashed entries at block 304.

At block 306, based on a determination that the hashed credential 230 matches a hashed entry of the plurality of hashed entries, the processor 102 may output an alert, disable access by the user 220 to the device 210, an application, a service, or a network, shut down the device, or quarantine the device 210 from the network 212. The processor 102 may perform any of the actions described at block 306 in any of the manners discussed herein.

According to examples, the processor 102 may determine whether the processor 102 is to determine whether the hashed credential 230 matches a hashed entry of the plurality of hashed entries. In instances in which the processor 102 determines that the processor 102 is not to make this determination, the processor 102 may determine that an external server is to make this determination. In addition, based on a determination that the processor 102 is to make this determination, the processor 102 may execute the method 300. However, based on a determination that the processor 102 is not to make this determination, e.g., that an external server is to make this determination, the processor 102 may send the accessed hashed credential to the external server. The processor 102 may also or alternatively send the hash function used to generate the hashed credential along with a salt value, if used, to the external server. The external server may use the hash function and the salt value, if received, to generate the hashed entries and may determine whether the hashed credential matches any of the hashed entries. The external server may also return the determination of whether the hashed credential matches any of the hashed entries back to the processor 102.

The processor 102 may determine which of the processor 102 or the external server is to determine whether the hashed credential matches a hashed entry based on respective security levels of the apparatus 100 and the external server. In some examples, the processor 102 may select the processor 102 or the external server based on which of the apparatus 100 or the external server has a higher security level. In other examples, the processor 102 may make the selection based on whether there are restrictions, e.g., for security purposes, on the communication of the hashed credential 230 over a network. In still other examples, the processor 102 may make the selection based on whether there are restrictions on the identification of the credential 222 on the apparatus 100. In still further examples, a user, an administrator, or the like, may define whether the processor 102 or the external server is to determine whether the hashed credential matches a hashed entry.

Turning now to FIG. 4, at block 402, the processor 102 may automatically access hashed credentials 230 from a plurality of devices 210. The processor 102 may be in communication with the plurality of devices 210 via the network 212 and may automatically request and receive the hashed credentials 230 from the devices 210. In addition, the processor 102 may automatically request the hashed credentials 230 from the devices 210 in a periodic manner, e.g., at preset times, at present time intervals, etc.

At block 404, the processor 102 may determine which of the hashed credentials 230 matches hashed entries of a plurality of hashed entries. That is, the processor 102 may compare each of the hashed credentials 230 with the plurality of hashed entries corresponding to the entries in the dictionary of commonly used credentials and determine which, if any, of the hashed credentials 230 matches a hashed entry.

At block 406, the processor 102 may maintain a log of the devices 210 from which hashed credentials 230 matching a hashed entry were accessed. For instance, the processor 102 may maintain a listing of the devices 210 and whether the hashed credential 230 or hashed credentials 230 received from the devices 210 match a hashed entry.

At block 408, the processor 102 may determine in which of the devices 210 from which the hashed credentials 230 matching the hashed entries were accessed have been changed to not match a hashed entry of the plurality of hashed entries. For instance, the processor 102 may send another request for the hashed credentials 230 to each of the devices 210 and may receive the hashed credentials 230 from the devices 210. In other examples, the processor 102 may send the request for the hashed credentials 230 to the devices 210 from which the hashed credentials 230 matching the hashed entries were accessed and the processor 102 may receive the hashed credentials 230 from those devices 210. In any regard, the processor 102 may determine whether the received hashed credentials 230 have been changed from the prior received hashed credentials 230. For those hashed credentials 230 that have been changed, the processor 102 may determine whether those hashed credentials 230 match hashed entries corresponding to the entries in the accessed dictionary of commonly used credentials.

At block 410, the processor 102 may update the log with an indication of the devices 210 where the hashed credentials 230 have been changed to have values that do not match a hashed entry of the plurality of entries. The processor 102 may continue to update the log as additional hashed credentials 230 are received from the devices 210.

According to examples, based on the log, the processor 102 may perform at least one of a reporting or a blocking operation on the users 220 and/or the devices 210 to which the hashed credentials 230 are determined to match a hashed entry. The processor 102 may also or alternatively provide the updated log to an administrator such that the administrator may identify which users 220 and/or devices 210 have associated credentials 222 that may match hashed entries of a dictionary of commonly used credentials. In other words, the processor 102 may provide the administrator with a list of users 220 and/or devices 210 that may have weak credentials, e.g., credentials that may be identified through a brute-force attach using commonly used credentials.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
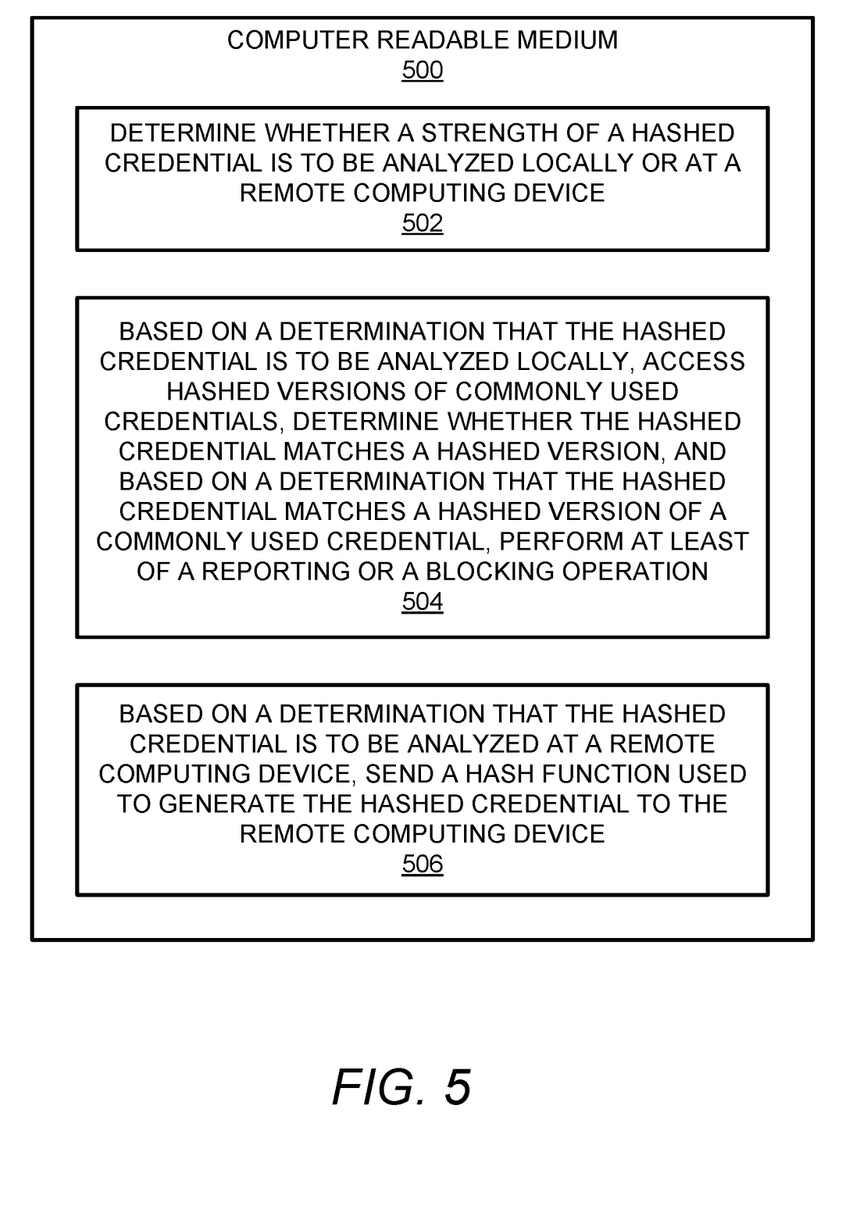
FIG. 5 depicts a block diagram of a computer readable medium that may have stored thereon machine readable instructions that when executed by a processor, may cause the processor to determine whether a hashed credential matches a hashed version of a commonly used credential in accordance with an embodiment of the present disclosure.

Turning now to FIG. 5, there is shown a block diagram of a computer readable medium 500 that may have stored thereon machine readable instructions that when executed by a processor, may cause the processor to determine whether a hashed credential matches a hashed version of a commonly used credential according to an embodiment of the present disclosure. It should be understood that the computer readable medium 500 depicted in FIG. 5 may include additional instructions and that some of the instructions described herein may be removed and/or modified without departing from the scope of the computer readable medium 500 disclosed herein. The computer readable medium 500 may be a non-transitory computer readable medium. The term "non-transitory" does not encompass transitory propagating signals.

The computer readable medium 500 may have stored thereon machine readable instructions 502-506 that a processor, such as the processor 102 depicted in FIGS. 1 and 2, may execute. The computer readable medium 500 may be an electronic, magnetic, optical, or other physical storage device that contains or stores executable instructions. The computer readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to determine whether a strength of a hashed credential 230 is to be analyzed locally or at a remote computing device. As discussed herein, the processor may make this determination based on security concerns related to making this determination locally or at the remote computing device. The processor may fetch, decode, and execute the instructions 504 to, based on a determination that the hashed credential is to be analyzed locally, access hashed versions of a plurality of commonly used credentials, determine whether the hashed credential 230 matches a hashed version of a commonly used credential, and based on a determination that the hashed credential 230 matches a hashed version of a commonly used credential, perform at least one of a reporting or a blocking operation. However, based on a determination that the hashed credential 230 does not match a hashed version of a commonly used credential, the processor may output an indication that the hashed credential 230 does not match any of the commonly used credentials or may not output any indication.

The processor may fetch, decode, and execute the instructions 506 to, based on a determination that the hashed credential 230 is to be analyzed at a remote computing device, send a hash function used to generate the hashed credential 230 to the remote computing device. The remote computing device may use the hash function to generate the hashed versions of the commonly used credentials and to compare the hashed credential 230 with the hashed versions to determine whether the hashed credential 230 matches any of the hashed versions. The remote computing device may communicate a determination as to whether the hashed credential 230 matches any of the hashed versions to the processor 102.

According to examples, to perform at least one of the reporting or blocking operation, the instructions in the computer readable medium may further cause the processor to output an alert, disable a user access to the device, an application, or a network, shut down the device; or quarantine the device from the network. In addition, or alternatively, the instructions may further cause the processor to automatically and periodically access the hashed credential to, for instance, periodically determine whether the hashed credential 230 has been changed and whether the hashed credential 230 matches any of the hashed versions of the commonly used credentials. In addition or alternatively, the instructions may further cause the processor to access the plurality of commonly used credentials and to apply a hash function that was used to generate the hashed credential 230 to the commonly used credentials to generate the hashed versions of the commonly used credentials.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium on which is stored machine readable instructions that are to cause the processor to:
receive a hashed credential associated with a user from a device of the user, wherein the device generated the hashed credential through use of a hash function;
determine the hash function used by the device to generate the received hashed credential;
send the determined hash function to a remote server, wherein the remote server is to apply the determined hash function to a plurality of commonly used credentials to generate a plurality of hashed versions of the commonly used credentials and to return the plurality of commonly used credentials to the apparatus;
receive the generated plurality of hashed versions of the generated plurality of commonly used credentials from the remote server;
determine whether the hashed credential matches a hashed version of a commonly used credential of the plurality of commonly used credentials; and
based on a determination that the hashed credential matches a hashed version of a commonly used credential, perform at least one of a reporting or a blocking operation.

2. The apparatus of claim 1, wherein the plurality of commonly used credentials is included in a dictionary of commonly used credentials.

3. The apparatus of claim 1, wherein to perform at least one of the reporting or blocking operation, the instructions are further to cause the processor to:
output an alert;
disable a user access to the device, an application, or a network;
shut down the device; or
quarantine the device from the network.

4. The apparatus of claim 1, wherein the user device is a personal computer, a laptop computer, a tablet computer, or a smartphone.

5. The apparatus of claim 1, wherein the instructions are further to cause the processor to automatically and periodically access the hashed credential.

6. The apparatus of claim 1, wherein the apparatus is a personal computer, a laptop computer, a tablet computer, a smartphone, a network gateway, a network router, or a server.

7. The apparatus of claim 1, wherein the hashed credential comprises a user name, a user password, a device name, or a device password.

8. The apparatus of claim 1, wherein a salt value is used in the hashing of the hashed credential, and wherein the instructions are further to cause the processor to send the salt value to the remote server, wherein the remote server is to add the salt value to the commonly used credentials and to apply the hash function to the commonly used credentials with the added salt value to generate the hashed versions of the commonly used credentials.

9. A method comprising:
receiving, by a processor, a hashed credential associated with a user from a device of the user, wherein the device generated the hashed credential through use of a hash function;
determining, by the processor, the hash function used by the device to generate the received hashed credential;
sending, by the processor, the determined hash function to a remote server, wherein the remote server is to apply the determined hash function to a plurality of entries corresponding to commonly used credentials to generate a plurality of hashed entries of the commonly used credentials and to return the plurality of commonly used credentials to the processor;
receiving, by the processor, the generated plurality of hashed entries of the commonly used credentials from the remote server;
determining, by the processor, whether the hashed credential matches a hashed entry of the received plurality of hashed entries, wherein a plurality of entries corresponding to the plurality of hashed entries are included in a dictionary of commonly used credentials; and
based on a determination that the hashed credential matches a hashed entry of the received plurality of hashed entries, by the processor:
outputting an alert;
disabling access by the user to the device, an application, or a network;
shutting down the device; or
quarantining the device from the network.

10. The method of claim 9, wherein the hashed credential is a hashed version of the credential with a salt value added to the credential, the method further comprising:
determining the salt value; and
sending the determined salt value to the remote server, wherein the remote server is to add the determined salt value to the plurality of entries to generate entries with salt values and to generate the plurality of hashed entries of the commonly used credentials with the salt values.

11. The method of claim 9, further comprising:
automatically accessing hashed credentials from a plurality of devices;
determining which of the hashed credentials matches a hashed entry of the plurality of hashed entries;
maintaining a log of the devices from which hashed credentials matching the hashed entries were accessed;
determining in which of the devices from which the hashed credentials matching the hashed entries were accessed have been changed to have values that do not match a hashed entry of the plurality of hashed entries; and
updating the log with an indication of the devices where the hashed credentials have been changed to have values that do not match a hashed entry of the plurality of hashed entries.

12. The method of claim 9, further comprising:
determining whether the processor is to determine whether the hashed credential matches a hashed entry of the plurality of hashed entries; and
based on a determination that the processor is to determine whether the hashed credential matches a hashed entry of the plurality of hashed entries, determine whether the hashed credential matches a hashed entry of the plurality of hashed entries.

13. The method of claim 12, further comprising:
based on a determination that the processor is not to determine whether the hashed credential matches a hashed entry of the plurality of hashed entries, send the accessed hashed credential to a remote server for the remote server to determine whether the hashed credential matches a hashed entry of the plurality of hashed entries.

14. A computer readable medium on which is stored machine readable instructions that when executed by a processor, cause the processor to:
receive a hashed credential associated with a user from a device of the user, wherein the device generated the hashed credential through use of a hash function;
determine a hash function used to generate the received hashed credential;
send the determined hash function to a remote server, wherein the remote server is to apply the determined hash function to a plurality of commonly used credentials to generate a plurality of hashed versions of the commonly used credentials and to return the plurality of commonly used credentials to the processor;
receive the generated plurality of hashed versions of the generated plurality of commonly used credentials from the remote server;
determine whether the hashed credential matches a hashed version of a commonly used credential of the received plurality of commonly used credentials; and
based on a determination that the hashed credential matches a hashed version of a commonly used credential, perform at least one of a reporting or a blocking operation.

15. The computer readable medium of claim 14, wherein to perform at least one of the reporting or blocking operation, the instructions are further to cause the processor to:
output an alert;
disable a user access to the device, an application, or a network;
shut down the device; or
quarantine the device from the network.

16. The computer readable medium of claim 14, wherein the instructions are further to cause the processor to automatically and periodically access the hashed credential.

* * * * *